US008739049B2

(12) United States Patent
Kropinski et al.

(10) Patent No.: US 8,739,049 B2
(45) Date of Patent: May 27, 2014

(54) VEHICLE SYSTEM MODELING SYSTEMS AND METHODS

(75) Inventors: Michael A. Kropinski, Troy, MI (US); Minghui Kao, Rochester Hills, MI (US); Gary Ferries, Rochester Hills, MI (US); Hamid M. Esfahan, Ann Arbor, MI (US); Wen-Chuan Lin, Novi, MI (US); Michael A. Steele, Southfield, MI (US); Onassis Matthews, Novi, MI (US)

(73) Assignee: GM Global Technology Operations LLC

(*) Notice: Subject to any disclaimer, the term of this patent is extended or adjusted under 35 U.S.C. 154(b) by 217 days.

(21) Appl. No.: 12/861,176

(22) Filed: Aug. 23, 2010

(65) Prior Publication Data

US 2011/0288840 A1 Nov. 24, 2011

Related U.S. Application Data

(60) Provisional application No. 61/347,629, filed on May 24, 2010.

(51) Int. Cl.
*G06F 15/00* (2006.01)
*G06F 13/00* (2006.01)

(52) U.S. Cl.
USPC .............................. 715/763; 703/8; 763/764

(58) Field of Classification Search
USPC ......... 715/763–765, 700, 734–736, 751–753; 703/8, 13
See application file for complete search history.

(56) References Cited

U.S. PATENT DOCUMENTS

| | | | |
|---|---|---|---|
| 7,067,740 B1 | 6/2006 | Belov et al. | |
| 7,076,740 B2 | 7/2006 | Santori et al. | |
| 7,644,398 B2 | 1/2010 | Cleaveland et al. | |
| 8,612,192 B2 | 12/2013 | Larsson et al. | |
| 2003/0182027 A1* | 9/2003 | Mocek | 701/1 |
| 2005/0275284 A1 | 12/2005 | Katayama | |
| 2006/0277010 A1* | 12/2006 | Schutte et al. | 703/8 |
| 2007/0038422 A1 | 2/2007 | Wang et al. | 703/8 |
| 2007/0088469 A1 | 4/2007 | Schmiedel et al. | |

(Continued)

FOREIGN PATENT DOCUMENTS

CN 101308365 11/2008

OTHER PUBLICATIONS

U.S. Appl. No. 12/555,338, filed Sep. 8, 2009, Esfahan et al.
U.S. Appl. No. 12/861,207, filed Aug. 23, 2010, Larsson et al.

(Continued)

*Primary Examiner* — Cao "Kevin" Nguyen

(57) ABSTRACT

A vehicle simulation system includes a compiler module, a parser module, a wrapper module, a modeling module, and a simulation module. The compiler module generates object code that is compatible with a first type of operating system based on source code that is executable by a vehicle control module and that is compatible with a second type of operating system. The parser module generates a definitions file and an extensible markup language (XML) file based on the source code and the object code. The wrapper module generates a library file based on the object code and the definitions file. The modeling module generates model-based source code for a virtual model based on the XML file and a user configuration of the virtual model. The simulation module simulates operation of a plant of a vehicle with the virtual model.

20 Claims, 15 Drawing Sheets

(56) References Cited

U.S. PATENT DOCUMENTS

| | | | |
|---|---|---|---|
| 2008/0004840 A1 | 1/2008 | Pattipatti et al. | |
| 2008/0133206 A1 | 6/2008 | Devins et al. | |
| 2008/0215304 A1 | 9/2008 | Bailey et al. | |
| 2009/0157236 A1* | 6/2009 | Van Gaasbeck et al. | 701/3 |
| 2009/0306866 A1 | 12/2009 | Malikopoulos | 701/59 |
| 2009/0306952 A1 | 12/2009 | Kajitani et al. | 703/13 |
| 2010/0082303 A1* | 4/2010 | Rousseau et al. | 703/1 |
| 2011/0066416 A1 | 3/2011 | Sachs | |
| 2011/0153536 A1 | 6/2011 | Yang et al. | |
| 2012/0022847 A1 | 1/2012 | Bailey et al. | |

OTHER PUBLICATIONS

Kurt J. Mitts, Keith Lang, Thierry Roudier, and Daniel L. Kiskis; SAE Technical Paper Series 2009-01-0520; "Using a Co-simulation Framework to Enable Software-in-the-Loop Powertrain System Development"; Copyright 2009 SAE International; 6 pages.

dSPACE Catalog 2008, pp. 1-505.

Alexander Eichberger; "Generating Multibody Real-Time Models for Hardware-in-the-Loop Applications"; 2003; 4 pages.

David Wenzhong Gao, Chris Mi, Ali Emadi; "Modeling and Simulation of Electric and Hybrid Vehicles" —Proceedings of the IEEE, vol. 95, No. 4, Apr. 2007; 17 pages.

* cited by examiner

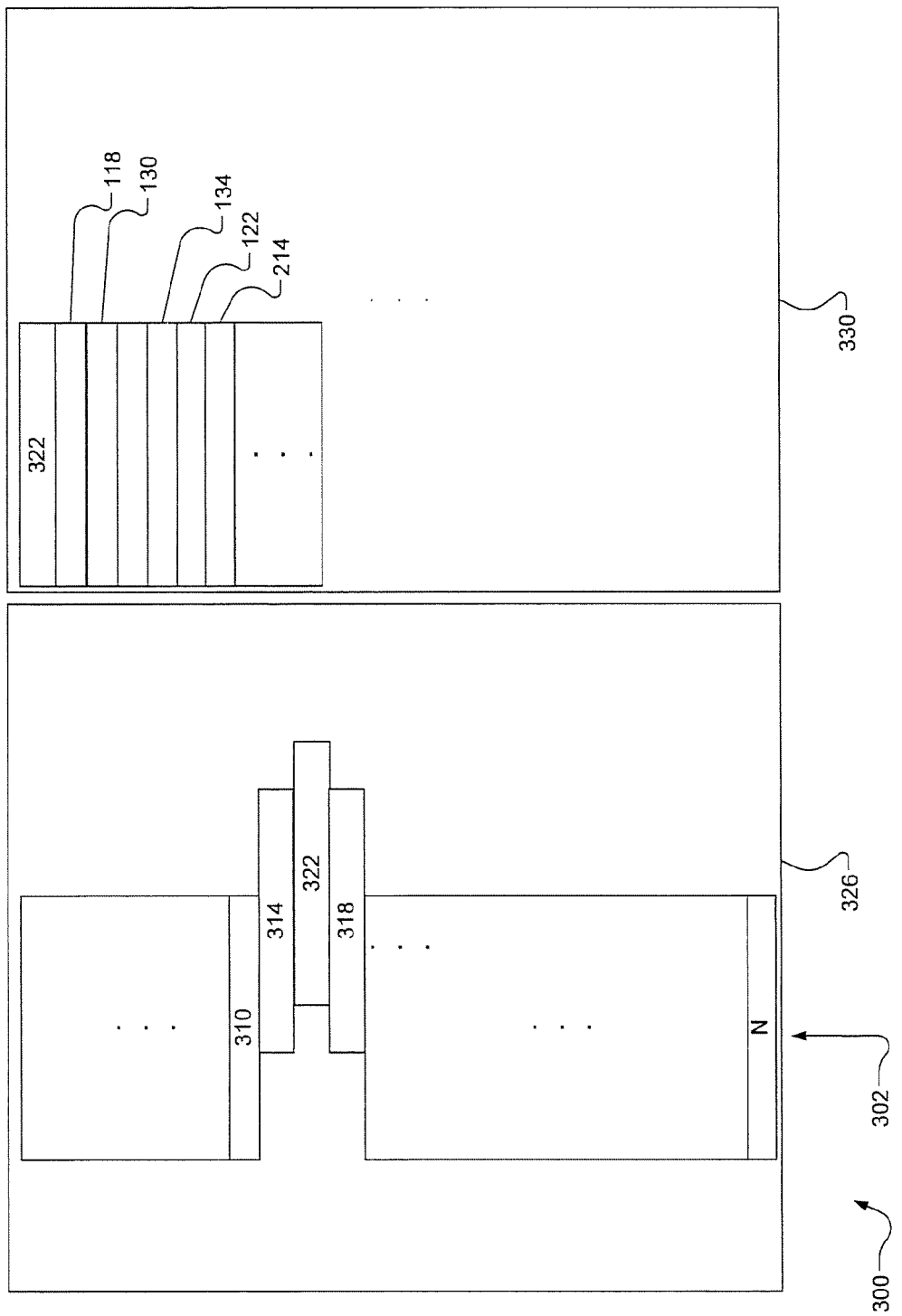

VEHICLE SYSTEM MODELING SYSTEMS AND METHODS

CROSS-REFERENCE TO RELATED APPLICATIONS

This application claims the benefit of U.S. Provisional Application No. 61/347,629, filed on May 24, 2010. The disclosure of the above application is incorporated herein by reference in its entirety.

This application is related to U.S. patent application Ser. No. 12/861,207 filed on Aug. 23, 2010. The disclosure of the above application is incorporated herein by reference in its entirety.

FIELD

The present disclosure relates to vehicle hardware and software simulation systems and methods.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Vehicle controllers and hardware may be tested in a simulated environment before production to ensure component and system fidelity. The simulated environment is provided by a vehicle simulation system. Vehicle simulation systems exist for hardware in-the-loop (HIL) testing. HIL testing includes using embedded software that is executed on a target control module, which interfaces with physical and simulated loads.

Although HIL testing can be effective, HIL testing requires developing physical loads or real time simulated loads, which can be expensive and can only be performed late in a development cycle. HIL testing also includes using a set of hardware devices, such as a vehicle control module (e.g., transmission control module) and a signal simulator.

SUMMARY

A vehicle simulation system includes a compiler module, a parser module, a wrapper module, a modeling module, and a simulation module. The compiler module generates object code that is compatible with a first type of operating system based on source code that is executable by a vehicle control module and that is compatible with a second type of operating system. The parser module generates a definitions file and an extensible markup language (XML) file based on the source code and the object code. The wrapper module generates a library file based on the object code and the definitions file. The modeling module generates model-based source code for a virtual model based on the XML file and a user configuration of the virtual model. The simulation module simulates operation of a plant of a vehicle with the virtual model.

A vehicle simulation method includes: generating object code that is compatible with a first type of operating system based on source code that is executable by a vehicle control module and that is compatible with a second type of operating system; generating a definitions file and an extensible markup language (XML) file based on the source code and the object code; generating a library file based on the object code and the definitions file; generating model-based source code for a virtual model based on the XML file and a user configuration of the virtual model; and simulating operation of a plant of a vehicle with the virtual model.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 3 is an illustration of an exemplary file structure of an operating system according to the principles of the present disclosure;

DETAILED DESCRIPTION

Figure 1A:
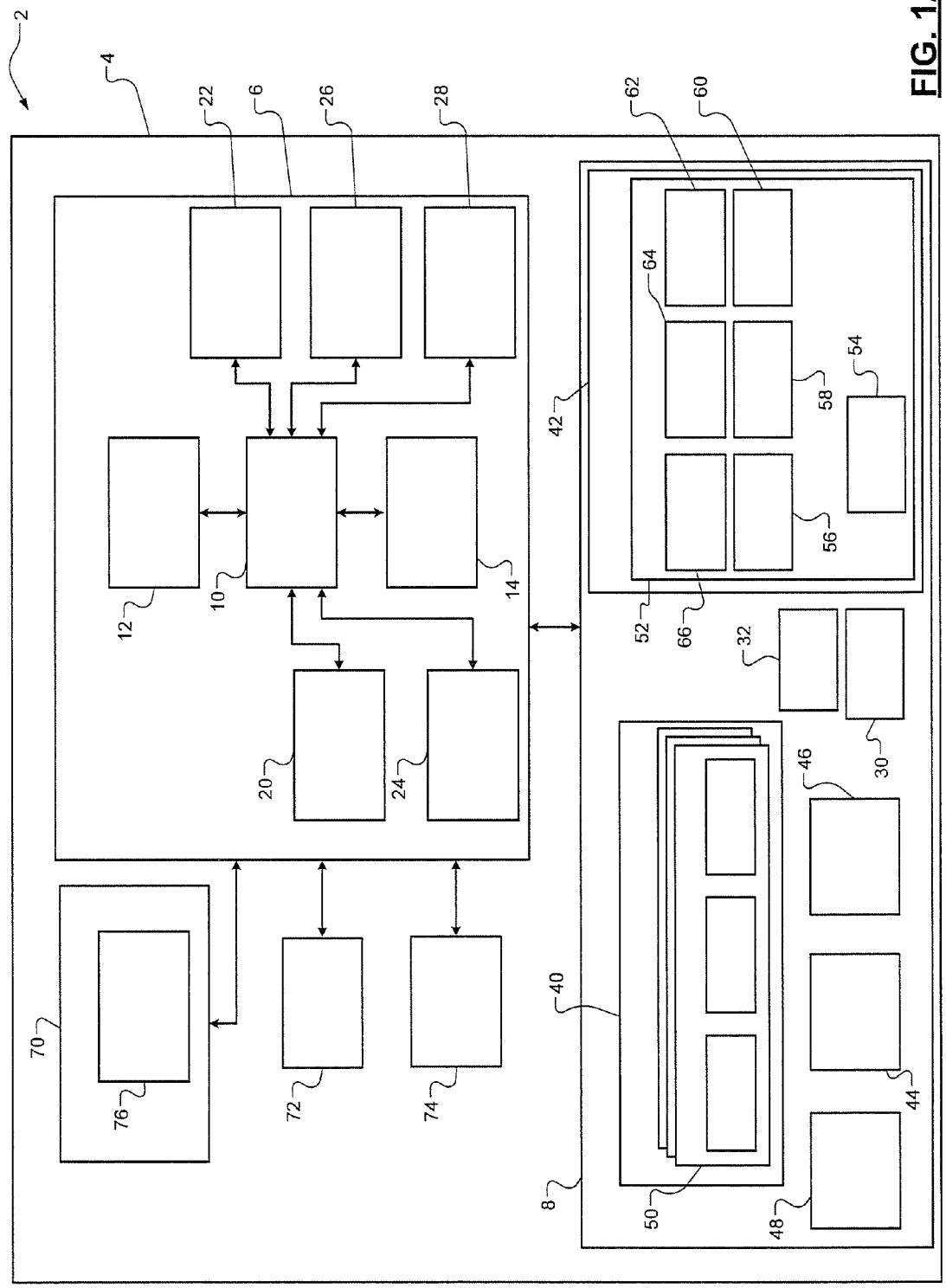
FIGS. 1A, 1B, and 2 are functional block diagrams of exemplary vehicle simulation systems according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

A first alternative to hardware in-the-loop (HIL) testing includes the simulation of a vehicle control module using source code (e.g., C code, Fortran, etc.) and simulation of a plant model. The source code may be hand code or code generated in an automated manner (referred to as autocode). Hand code may refer to the manipulation of source code manually and can include errors. The HIL testing approach is not expandable as the code associated with the vehicle control module is fixed. Changes to the source code and execution of additional simulations are tedious using this approach.

Another alternative to HIL testing (referred to as 2-mode hybrid bus testing) includes simulating a vehicle control module and vehicle components or systems using model-based software. The model-based simulation software (e.g., Matlab and Simulink software by Mathworks) operates in a Microsoft Windows operating system and involves the connecting of function blocks and corresponding inputs and outputs to create a model. Models are developed in the Windows environment and autocode may be generated based on the developed models. Model-based software is user friendly and allows for easy manipulation of models, function blocks, signals, etc. However, 2-mode hybrid bus testing does not allow for incorporating software of a vehicle control module that is written in C code.

As an alternative to HIL testing, software in-the-loop (SIL) testing may be performed. SIL testing includes automotive control system simulation where behavior of all or a portion of a control algorithm is obtained by executing actual target embedded processor software of a vehicle control module in the simulation environment. SIL testing includes simulating loads, such as inputs and outputs of: a car area network (CAN), control modules, plant models, sensors, etc.

In an SIL testing environment, targeted software, such as software of a transmission control module (TCM), is linked virtually to a plant model. SIL testing does not require special plant associated hardware. A plant model simulates actual operation of the plant (e.g., engine, transmission or vehicle dynamics). The plant model receives inputs from a simulated control module and generates outputs, which may be fed back. The virtual linking of targeted software to a plant model allows a vehicle system to be evaluated in a virtual environment early in a development cycle.

In the following description the term task refers to a software function performed during a simulation or an item, function or step performed during a method. A function refers to a subroutine or subprogram that is a portion of code within a larger program. A task may include multiple sub-tasks. Also, in the following description the term ring refers to a set of tasks or functions.

Referring now to FIG. 1A, a functional block diagram of a vehicle simulation system 2 is presented. The vehicle simulation system 2 includes a host 4 with a host control module 6 and memory 8. The memory 8 may be remotely located from the host 4 and accessed via a network or may be located within the host 4, as shown.

The host control module 6 includes a vehicle system simulation (VSS) control module 10 that controls simulation of one or more vehicle control modules, components and systems of a vehicle. The VSS control module 10 may control: converting source code to model-based code; combining of model-based code generated from source code and model-based code generated via simulation software; and generation of a model based on model-based code.

The host control module 6 may include a model generation module 12, a scheduling module 14, a driving cycle module 20, a plant model selecting module 22, a data processing module 24, a calibration module 26, and a debugger module 28.

The model generation module 12 generates SIL models. For example, the model generation module 12 may be used to generate a model that may be used in conjunction with a model of a plant, such as a transmission, an engine, a vehicle, or another suitable plant. The model generation module 12 may set up one or more models including hooking inputs and outputs of the newly generated models to objects of other models. Hooking may refer to, for example, connecting the inputs and outputs of a model to signal lines or nodes of a block and/or model. Objects may be nodes, signal lines, inputs, outputs, stored variables, etc.

The scheduling module 14 schedules the order in which simulation tasks are performed in the simulation environment. The scheduling module 14 may be event and/or time based. Tasks may be performed based on conditions and/or may be performed, for example, in a sequential order. As an example, a series of tasks may be performed when a certain condition or event occurs. Multiple tasks may be performed during a given period. The scheduling module 14 may schedule, for example, algorithm tasks, functions, control system software tasks, and other suitable tasks.

The driving cycle module 20 controls inputs to one or more control models. For example, the driving cycle module 20 may select between and supply user inputs, pre-defined signal inputs, and stored vehicle signals to a given model.

The plant model selecting module 22 selects a fidelity level of one or more plant models. A fidelity level refers to the complexity of a plant model and a degree to which the plant model accurately simulates actual components and/or systems of the plant. Simulation of a plant model with a greater fidelity level may more accurately simulate how the plant will actually perform. However, processing time is generally longer for a greater fidelity level than for a lesser fidelity level.

The data processing module 24 selects objects to monitor, retrieves various data, processes various data, etc. Data associated with the monitored objects is stored in object data files 30 in the memory 8. The calibration module 26 allows for calibration of variables or stored values (in calibration files 32) in the memory 8. The calibration module 26 may adjust values of various types including boolean values, scalar values, tabular values, etc. The debugger module 28 is used to debug model-based code.

The memory 8 may include, for example, a source code based library 40, a modeling environment based library 42, input shared variables 44, output shared variables 46, and a function library 48. The source code based library 40 includes model-based code for models (or model sets 50) that are generated based on source code. Model-based code can be executed in a modeling environment and used to generate a virtual model. The virtual models may be viewed in the modeling environment using model-based software. Model-based code can be used in performing a simulation and simulating operation of the model in the simulation environment with one or more other models.

The modeling environment based library 42 may include models. For example only, the models may include plant models 52, such as control models 54, sensor models 56, controller area network (CAN) models 58, actuator models 60, transmission models 62, engine models 64, vehicle models 66, and other suitable models.

Each plant model may be used to simulate a corresponding plant. For example only, a sensor model may be used to simulate a sensor of a vehicle, such as an engine speed sensor, a vehicle speed sensor, a temperature sensor, a pressure sensor, a flow rate sensor, etc. A CAN model may be used to simulate output signals received via a CAN of a vehicle. An actuator model may be used to simulate an actuator, such as a spark plug, an electric motor, a throttle, a solenoid, a fuel injector, or another actuator of a vehicle.

The input and output shared variables 44 and 46 may refer to variables that may be shared by one or more models. The input and output shared variables 44 and 46 may include global variables or may include variables that may be associated with one or more models, algorithms, or functions. The function library 48 may include additional standard blocks, such as mathematical functions used to generate one or more blocks.

The host 4 may also include a display 70, a user input device 72, and a compiler 74. One or more graphical user interfaces (GUIs) 76 generated by the host control module 6 may be displayed for a user via the display 70. The user input device 72 may be, for example, a pointing device (e.g., a mouse, pen and tablet, touch screen, etc.), a keyboard, and/or one or more other suitable devices. The user input device 72 may include the display 70 in various implementations. The display 70 may include, for example, a monitor, a projector, or another suitable displaying device. The compiler 74 may compile one or more types of code, such as source code, model-based code, and/or autocode.

Figure 1B:
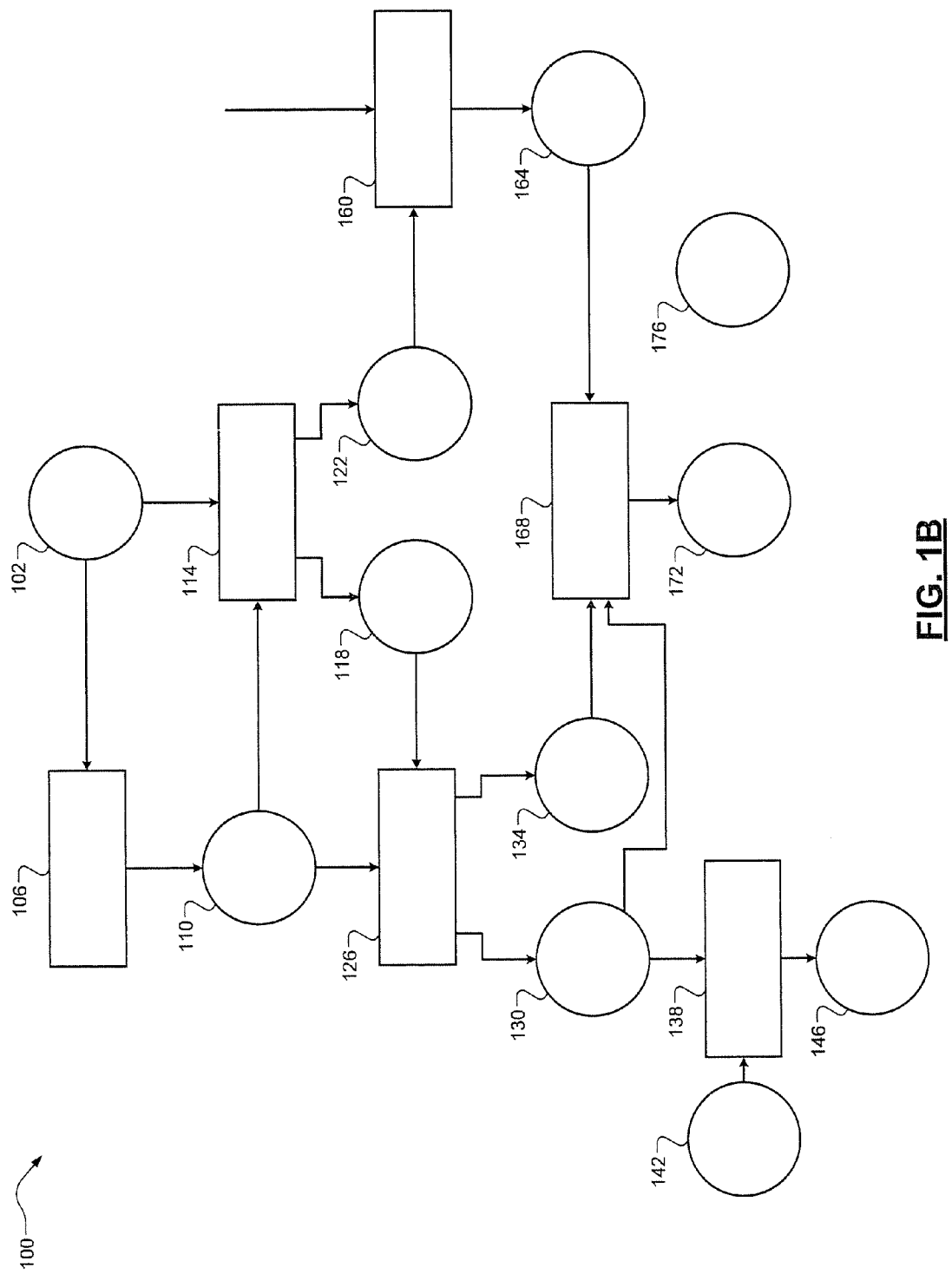

Referring now to FIG. 1B, another functional block diagram of an exemplary VSS system 100 is presented. A source code file 102 includes source code to be used in creating a model in a modeling environment. Operation of the model with one or more other models, such as a model of a plant (e.g., an engine, a transmission, an exhaust system, a vehicle, or another suitable plant) may be simulated in a simulation environment. For example only, the source code may be in a Fortran programming language, a C programming language, or another suitable programming language. The source code may be drafted in an automated manner, by hand, or in another suitable manner.

A cross-compiler module 106 compiles the source code. The cross-compiler module 106 may convert the source code into object code and store the object code in an object code file 110. The object code may be a binary code that is compatible with an operating system other than the operating system on which the cross-compiler module 106 runs. The operating system on which the cross-compiler module 106 runs will be referred to as a first operating system, and the operating system that is compatible with the object code will be referred to as a second operating system. For example only, the first operating system may include a Linux-based operating system or another suitable operating system, and the second operating system may include a Microsoft Windows-based operating system or another suitable operating system. For example only, the cross-compiler module 106 may include a mingw32-gcc module in various implementations.

A parser module 114 extracts information from the source code file 102 and the object code file 110. The parser module 114 produces a definitions file 118 and an extensible markup language (XML) file 122 based on the extracted information. The XML file 122 includes information describing the source code of the source code file 102, such as associated variables, calibrations, functions, algorithms, and other suitable information. The definitions file 118 contains information describing data that is to be exported from one or more libraries.

A wrapper module 126 may produce a source code dynamic-link library (DLL) file 130 and a static library file 134 based on data from the definitions file 118 and the object code file 110. For example only, the wrapper module 126 may include a mingw32-dllwrap module in various implementations. In various implementations, the source code DLL file 130 and the static library file 134 may be included within one file.

A calibration enabling module 138 extracts calibration information from the source code DLL file 130 and one or more data (.DAT) files, such as data file 142. The calibration enabling module 138 produces a calibration file 146 based on data from the source code DLL file 130 and/or the one or more data files. The calibration file 146 may include information that may be used by a calibration module, such as an INCA module (not shown). For example only, the calibration file 146 may be an XML file.

When prompted via a user input, a modeling module 160 produces and displays one or more graphical user interfaces (GUIs) (e.g., see FIGS. 2-14). The user input may include a user input made via a pointing device (e.g., a mouse, pen and tablet, touch screen, etc.), a keyboard, and/or one or more other suitable devices. The one or more GUIs may be displayed on a display screen (e.g., a monitor), a projector, or another suitable displaying device.

The modeling module 160 may operate in the second operating system. More specifically, the modeling module 160 may operate in a modeling environment (e.g., program space) that is compatible with the second operating system. For example only, the modeling module 160 may operate in a Simulink modeling environment.

The modeling module 160 retrieves data from the XML file 122 and selectively displays retrieved data for the user via the one or more of the GUIs. The user may configure a model in the modeling domain via the one or more GUIs. The modeling module 160 generates a model source code file 164 based on data retrieved from the XML file 122 and the configuration provided by the user. The model source code file 164 includes code that is compatible with the second operating system and operating in the modeling domain. For example only, the model source code file 164 may include s-function code or another suitable type of code. In other words, the model source code file 164 may include code written in an s-function programming language or in another suitable programming language.

An executable generating module 168 generates an executable DLL file 172 (also referred to as a dynamically loadable executable) based on the source code DLL file 130 and the model source code file 164. The executable generating module 168 may generate the executable DLL file 172 further based on the static library file 134. The executable generating module 168 may, for example, compile and link the model source code file 164 into the executable DLL file 172. The executable DLL file 172 is executable within the modeling environment by the modeling/simulating software. For example only, the executable DLL file 172 may be executable in conjunction with a model file 176 that includes a model of the plant.

Figure 2:
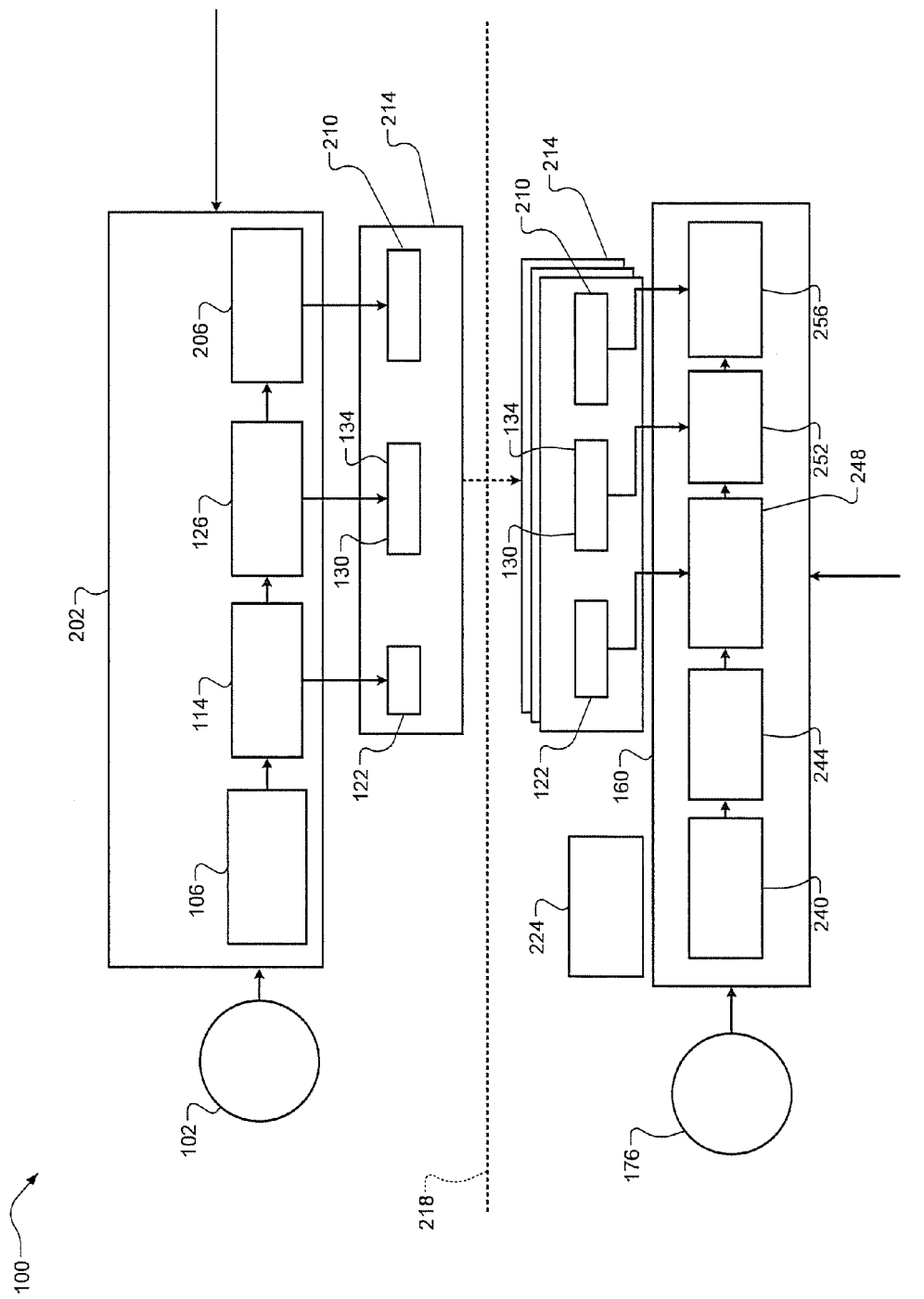

Referring now to FIG. 2, another exemplary functional block diagram of the VSS system 100 is presented. A building module 202 may include the cross-compiler module 106, the parser module 114, and the wrapper module 126. The building module 202 may also include a zipper module 206.

The zipper module 206 may zip the source code file 102 into a source code zip file 210. The zipper module 206 may zip the XML file 122, the source code DLL file 130, the static library file 134, and the source code zip file 210 into a zip file 214. For example only, the zipper module 206 may create the zip file 214 and zip the XML file 122, the source code DLL file 130, the static library file 134, and the source code zip file 210 into the zip file 214 when triggered via a user input. While not shown, the zipper module 206 may also zip the definitions file 118 and one or more other files into the zip file 214. Exemplary dashed line 218 illustrates an exemplary division between the first operating system and the second operating system.

Referring now to FIG. 3, an exemplary file structure 300 of the second operating system is presented. The file structure 300 may include N first-level items 302, where N is an integer greater than zero. For example only, the first-level items 302 may include folders, files, or other suitable items. Each of the first-level items 302 may include one or more sub-items, which may be referred to as second-level items. For example only, first level item 310 includes second-level items 314 and 318.

Each of the second-level items may include one or more sub-items. Sub-items of second-level items may be referred to as third-level items. For example only, the second-level item 314 includes a third-level item 322. Each of the third-level items may include one or more sub-items and so on.

The file structure 300 may be displayed in a first viewing pane 326. When one of the items of the file structure 300 is selected from the first viewing pane 326, the sub-items of the selected item, if any, may be presented in a second viewing pane 330. For example only, when the second-level item 314 is selected in the first viewing pane 326, the sub-items of the second-level item 314 are displayed in the second viewing pane 330.

Referring back to FIG. 2 and with continuing reference to FIG. 3, the user may store the zip file 214 as a sub-item of a predetermined one of the items of the file structure 300. For example only, the user may store the zip file 214 as a sub-item (i.e., a third-level item) of the second-level item 314, as shown in the example of FIG. 3. An un-zipper module 224 that is operable in the second operating system selectively unzips the zip file 214. More specifically, the un-zipper module 224 extracts the files zipped within the zip file 214 to a selected location. For example only, the un-zipper module 224 may extract the files to be sub-items of the second-level item 314, as shown in the example of FIG. 3. The source code zip file 210 may be extracted to be a sub-item (i.e., a fourth-level item) of the third-level item 322. In this manner, the source code zip file 210 may be kept separate from the other extracted files.

The modeling module 160 may include a GUI module 240, a data retrieving module 244, a configuration module 248, a model updating module 252, and a simulation module 256. When the user opens the modeling/simulating software, the GUI module 240 may open and display a first GUI for the user.

Figure 4:
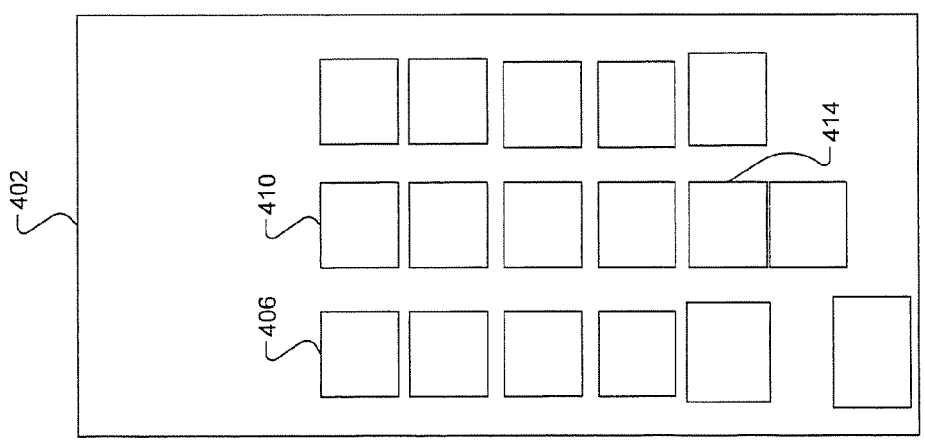
FIG. 4 is an illustration of an exemplary first graphical user interface (GUI) according to the principles of the present disclosure.

Referring now to FIG. 4, a diagram of an exemplary first GUI 402 is presented. The first GUI 402 may include a first set of predetermined options, such as option 406, option 410, etc. For example only, the first set of predetermined options may include arithmetic operators, logical operators, comparison operators, mathematical functions, counters and timers, delay blocks, subsystem blocks, non-linear blocks, control blocks, and filters and averages. The first set of predetermined options may also include, for example, parameters and constants, signals, analysis blocks (such as sources and sinks), model documentation, previously used blocks, examples, and model-based code generation option 414. When the user selects the model-based code generation option 414, the GUI module 240 may open and display a second GUI for the user.

Figure 5:
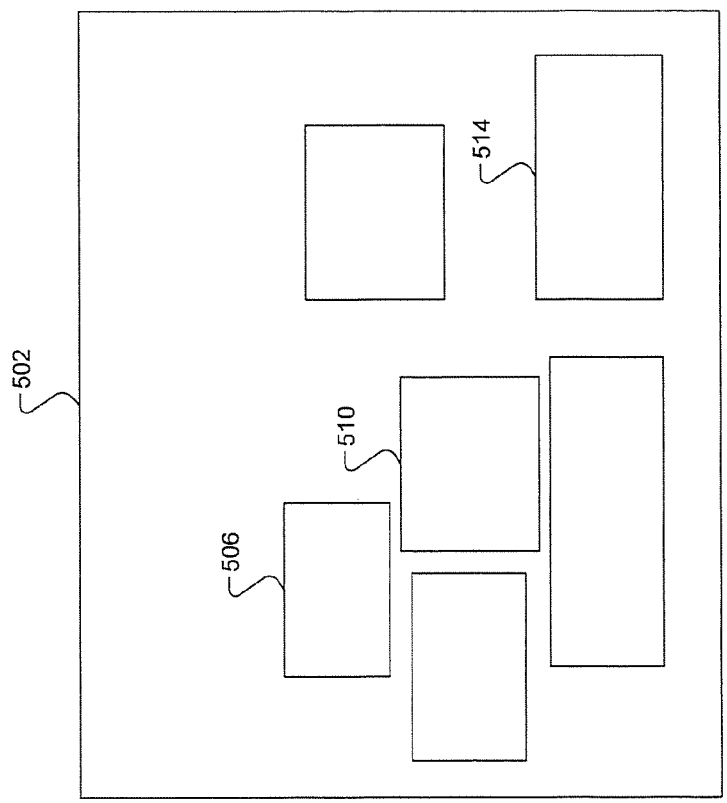
FIG. 5 is an illustration of an exemplary second GUI according to the principles of the present disclosure.

Referring now to FIG. 5, a diagram of an exemplary second GUI 502 is presented. The second GUI 502 may include a second set of predetermined options, such as option 506, option 510, etc. For example only, the second set of predetermined options may include a data object wizard option, a model helper option, a create internal types option, a legacy code option, an environment controller option, and a software in the loop (SIL) option 514. When the user selects the SIL option 514, the GUI module 240 may open and display a first SIL GUI for the user.

Figure 6:
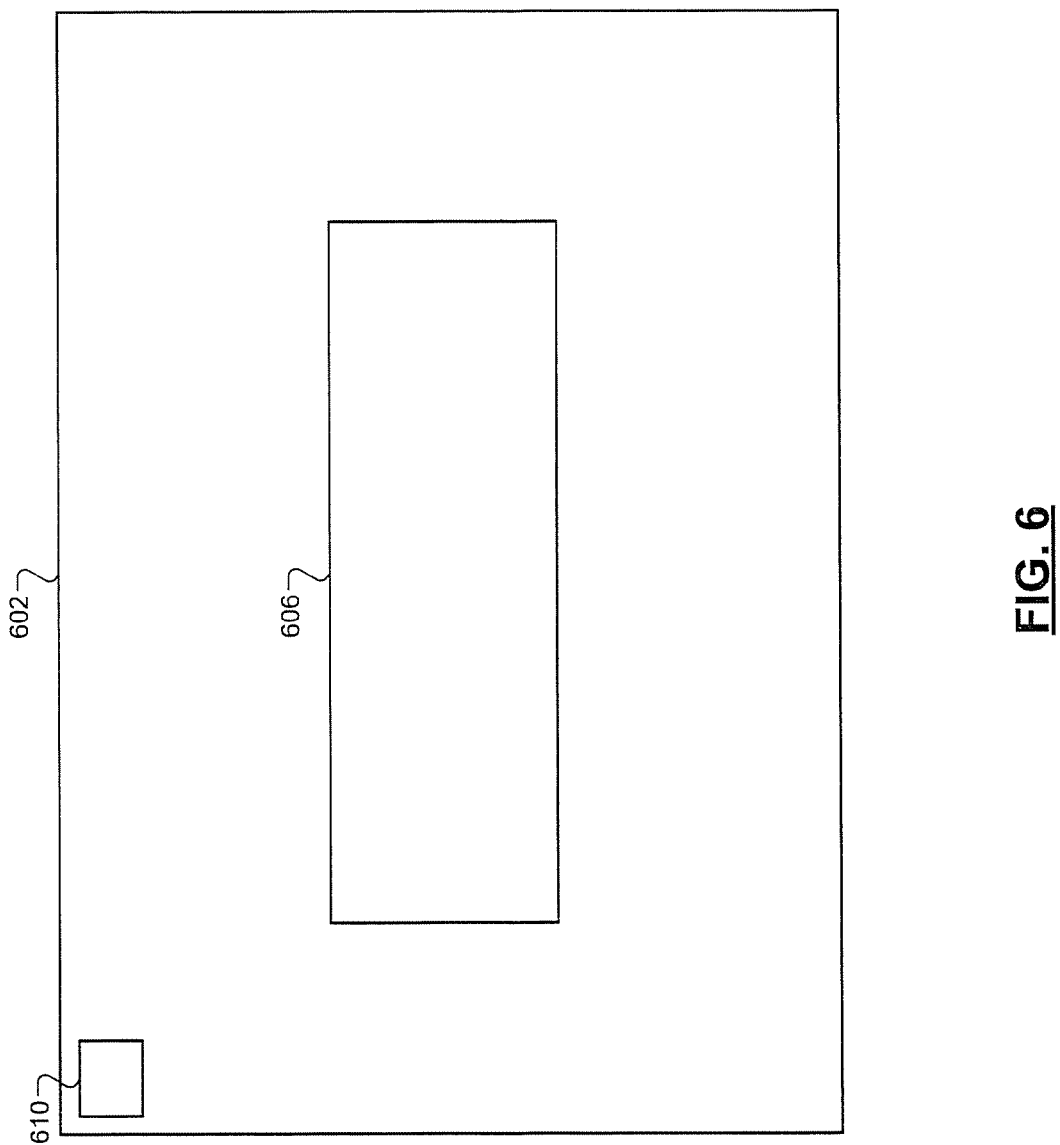
FIG. 6 is an illustration of a first exemplary software in the loop (SIL) GUI according to the principles of the present disclosure.

Referring now to FIG. 6, a diagram of an exemplary first SIL GUI 602 is presented. When the SIL option 514 is first selected by the user, an SIL module 606 in an initial state (e.g., blank) is displayed for the user. Collectively, the SIL module 606, inputs to the SIL module 606 (not shown), and the second set of predetermined options may include a data object wizard option, a model helper option, a create internal types option, a legacy code option, an environment controller option, and a software in the loop (SIL) option 514. When the user selects the SIL option 514, the GUI module 240 may open and display a first SIL GUI for the user.

Referring now to FIG. 6, a diagram of an exemplary first SIL GUI 602 is presented. When the SIL option 514 is first selected by the user, an SIL module 606 in an initial state (e.g., blank) is displayed for the user. Collectively, the SIL module 606, inputs to the SIL module 606 (not shown), and outputs from the SIL module 606 (not shown) may be referred to as a virtual model. A model may include zero to N number of SIL blocks. Each SIL block is associated with a single DLL file at a given time. However, more than one SIL block can use the same underlying DLL file or different underlying DLL files. An SIL block can be thought of like any other block in the modeling environment.

The user may load a previously saved virtual model via a menu 610. For example only, the menu 610 may include a file menu from which the user may select an open option (not shown) and select the previously saved virtual model from one or more previously saved virtual models. When the user loads a previously saved virtual model, the GUI module 240 displays the previously saved virtual model in the first SIL GUI 602.

The user may select a virtual model via the first SIL GUI 602. For example only, the user may select a virtual model by double-clicking the SIL module 606 or in another suitable manner. While selection of the SIL module 606 will be hereafter discussed, selection of a previously saved virtual model may render similar or identical results. When a virtual model is selected, the GUI module 240 may open and display a second SIL GUI for the user.

Figure 7:
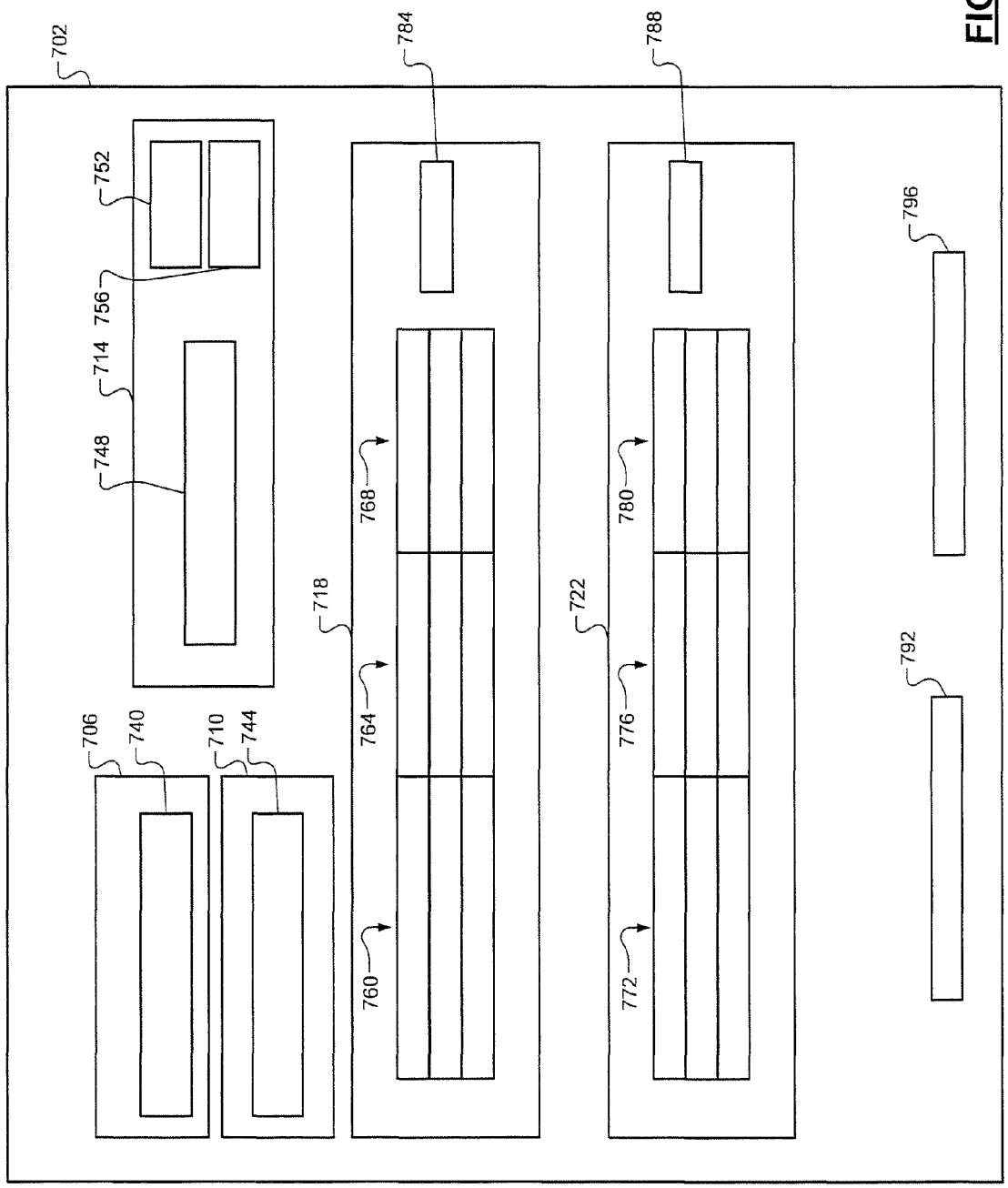
FIG. 7 is an illustration of a second exemplary SIL GUI according to the principles of the present disclosure.

Referring now to FIG. 7, a diagram of an exemplary second SIL GUI 702 is presented. The second SIL GUI 702 includes a plurality of fields that the user may use to configure the selected virtual model and/or a function that may be called by the selected virtual model. For example only, the second SIL GUI 702 may include an SIL build field 706, a functions field 710, a variables field 714, an inputs field 718, and an outputs field 722.

The data retrieving module 244 retrieves data for the SIL build field 706, the functions field 710, and the variables field 714. The data retrieving module 244 populates the SIL build field 706, the functions field 710, and the variables field 714 based on the retrieved data. More specifically, the data retrieving module 244 populates menus (e.g., drop-down menus) 740, 744, and 748 of the SIL build field 706, the functions field 710, and the variables field 714, respectively, based on the retrieved data.

Regarding the SIL build field 706, the data retrieving module 244 may look to the sub-items of a predetermined item in the file structure 300. For example only, where the un-zipper module 224 extracts the files to the second-level item 314, the data retrieving module 244 may look to the sub-items of the second-level item 314. The data retrieving module 244 may retrieve the name(s) of a predetermined type of sub-item of the predetermined item in the file structure 300. For example only, the data retrieving module 244 may retrieve the name(s) of the XML file(s) of the predetermined item in the file structure 300.

The data retrieving module 244 may populate the drop-down menu 740 of the SIL build field 706 based on the retrieved data. For example only, the data retrieving module 244 may populate the drop-down menu 740 with the name(s) of the XML file(s). When the user selects the drop-down menu 740 of the SIL build field 706, the GUI module 240 selectively displays the name(s) in the drop-down menu 740. The user may select a name from the drop-down menu 740. The name corresponds to a virtual model that the user can configure, include in a simulation with one or more other virtual models, and/or use in performing another suitable operation.

Once the user has selected the name (i.e., the virtual model), the data retrieving module 244 retrieves data regarding functions that are associated with the selected virtual model. The functions that are associated with the selected virtual model may be defined, for example, in the XML file. The data retrieving module 244 may populate the drop-down menu 744 of the functions field 710 with the name of the associated functions. The associated functions may include, for example, one or more functions that may be called by the selected virtual model, a null function, or a system function. The function(s) that may be called by the selected virtual model may be defined, for example, within the XML file.

When the null function or one of the functions that may be called by the selected virtual model has been selected, the user may selectively configure inputs and outputs via the variables field 714. The null function may be selected, for example, when the selected virtual model is to use one or more available variables without calling an associated function.

The data retrieving module 244 retrieves variables that are associated with the selected virtual model and variables that are available with the model file 176. The variables that are associated with the selected virtual model may be defined, for example, within the XML file. The data retrieving module 244 may populate the drop-down menu 748 of the variables field 714 with the associated variables.

When the user selects the variables field 714, the data retrieving module 244 selectively displays the names of the variables in the drop-down menu 748. The user may select one of the variables from the drop-down menu 748. Once one of the variables has been selected from the drop-down menu 748, the user may add the selected variable as an input or an output. The user may add the selected variable as an input by selecting an input option 752 of the variables field 714. The user may add the selected variable as an output by selecting an output option 756 of the variables field 714. The user may add one or more other inputs and/or outputs.

When an available variable is added as an input, the data retrieving module 244 adds the selected variable to the inputs field 718. More specifically, the data retrieving module 244 adds the selected variable to an inputs list 760 of the inputs field 718. The data retrieving module 244 may retrieve units data for the added input and dimension data for the added input. The data retrieving module 244 adds the units data and the dimension data to a units list 764 and a dimensions list 768, respectively, of the inputs field 718.

When a selected variable is added as an output, the data retrieving module 244 adds the selected variable to the outputs field 722. More specifically, the data retrieving module 244 adds the selected variable to an outputs list 772 of the outputs field 722. The data retrieving module 244 may retrieve units data for the added output and dimension data for the added output. The data retrieving module 244 adds the units data and the dimension data to a units list 776 and a dimensions list 780, respectively, of the outputs field 722.

When one of the functions that may be called by the selected virtual model has been selected via the functions field 710 (i.e., not the null function or the system function), the data retrieving module 244 retrieves inputs and/or outputs that are pre-associated with that function. The pre-associated inputs and/or outputs may be defined, for example, within the XML file. The data retrieving module 244 populates the (lists of) inputs field 718 and the outputs field 722 based on the pre-associated inputs and outputs, respectively.

The user can delete an added input from the inputs field 718 via an input delete option 784 of the inputs field 718. The user can delete an added output via an output delete option 788 of the outputs field 722. Pre-associated inputs and outputs, however, may be unavailable for deletion in some circumstances. The user can save the configuration of the second SIL GUI 702 (and the first SIL GUI 602) via a save option 792. The user can discard unsaved configurations via a cancel option 796.

Figure 8:
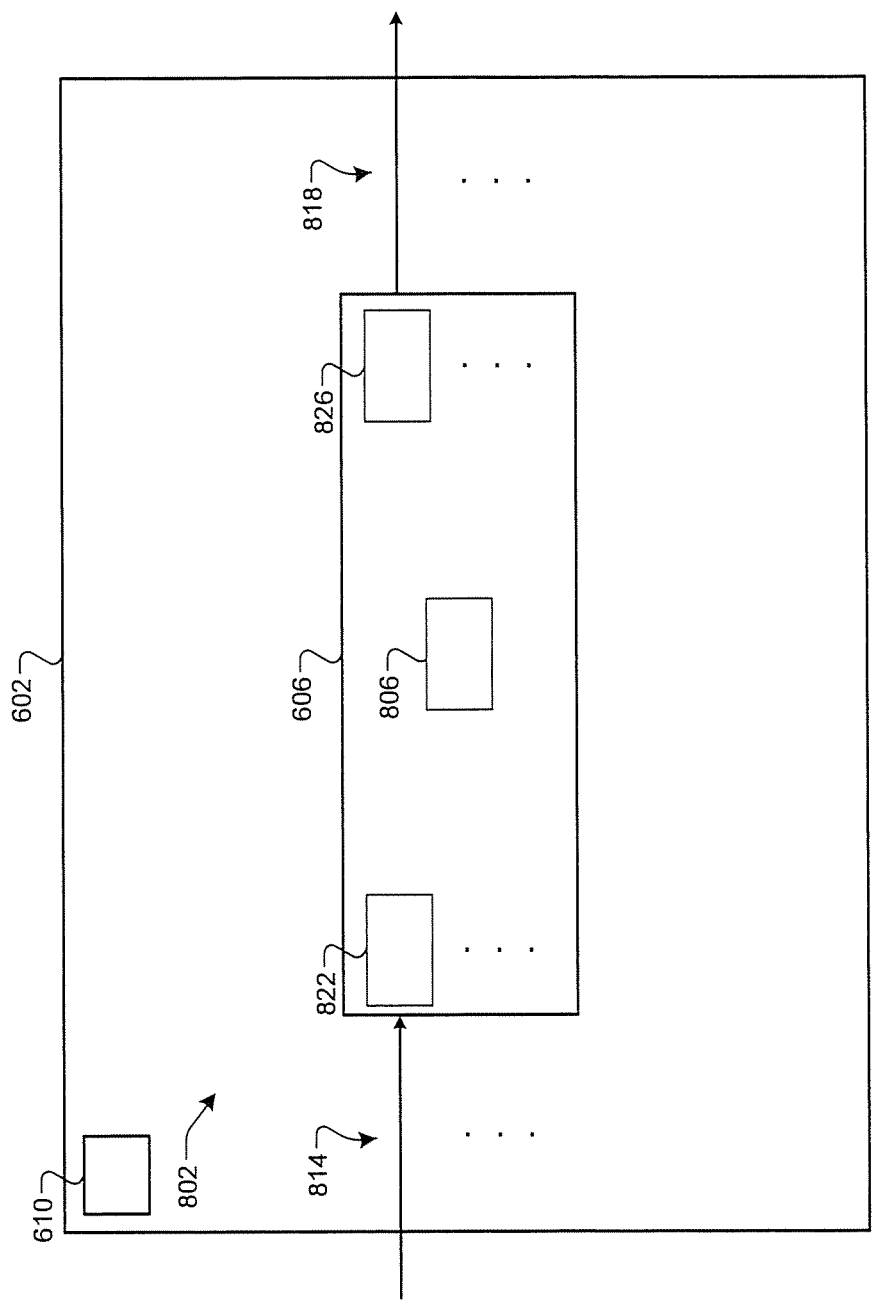
FIG. 8 is another exemplary illustration of the first SIL GUI according to the principles of the present disclosure.

Referring now to FIG. 8, another exemplary diagram of the first SIL GUI 602 is presented. The model updating module 252 updates the virtual model 802 displayed via the first SIL GUI 602 based on the configuration of the second SIL GUI 702. The model updating module 252 updates a name portion 806 of the SIL module 606 based on the function selected in the drop-down menu 744 of the functions field 710.

The model updating module 252 creates and displays an input indicator 814 (e.g., an arrow pointing to) for each input of the inputs field 718. The model updating module 252 creates and displays an output indicator 818 (e.g., an arrow pointing from) for each output of the outputs field 722. For each of the input and output indicators, the model updating module 252 may display the variable name and the units. The model updating module 252 may also display the dimensions and/or other suitable data. Examples of how the model updating module 252 may display the name and units for an input indicator and an output indicator are illustrated at 822 and 826, respectively.

The model updating module 252 may update the virtual model displayed via the first SIL GUI 602 based on the configuration of the second SIL GUI 702 when the user selects the save option 792. In various implementations, the model updating module 252 may update the first SIL GUI 602 each time that one of the fields of the second SIL GUI 702 is changed or at another suitable frequency.

Figure 9:
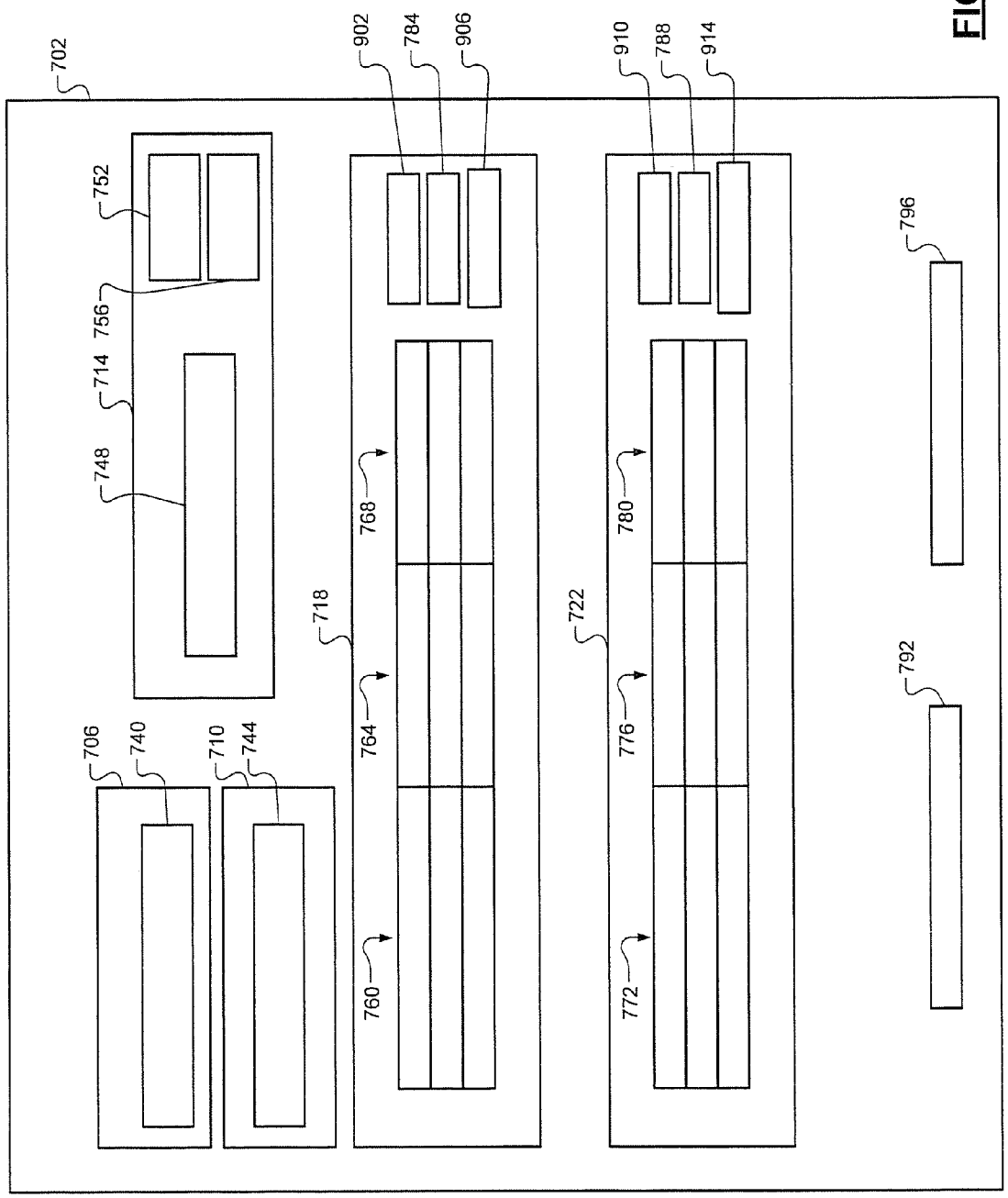
FIG. 9 is another exemplary illustration of the second SIL GUI according to the principles of the present disclosure.
Figure 10:
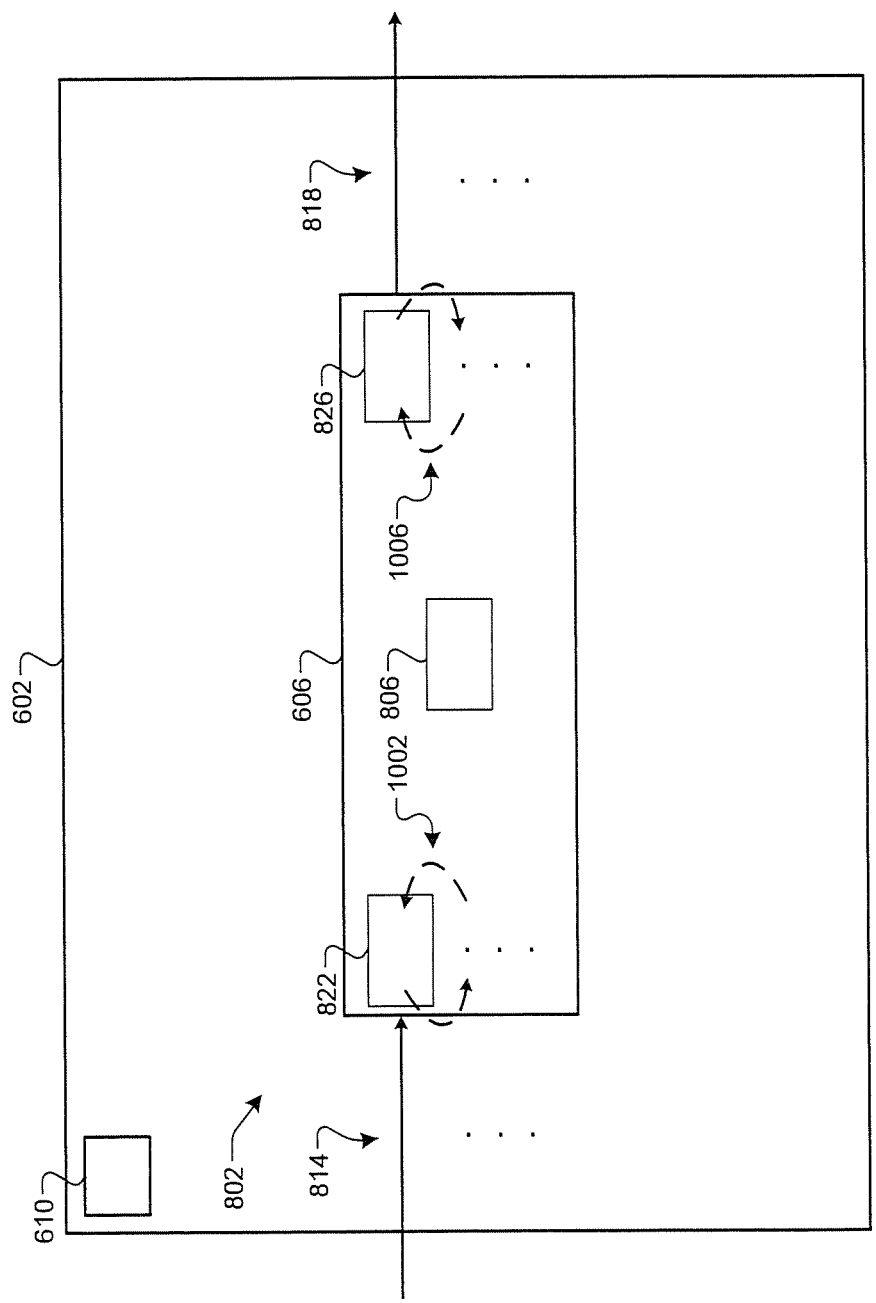
FIG. 10 is another exemplary illustration of the first SIL GUI according to the principles of the present disclosure.

FIG. 9 includes another exemplary diagram of the second SIL GUI 702. The inputs field 718 may also include an input UP option 902 and an input DOWN option 906. The input UP option 902 or the input DOWN option 906 may be used to move where a selected input is displayed with respect to the non-selected inputs in the first SIL GUI 602. For example only, when a user has selected one of the inputs in the inputs list 760 (or the units or dimensions associated with one of the inputs), the model updating module 252 may move the selected input up or down one location in the first SIL GUI 602 each time that the user selects the input UP option 902 or the input DOWN option 906, respectively. This is illustrated in FIG. 10 by exemplary dashed arrow sets 1002 and 1006.

Figure 11:
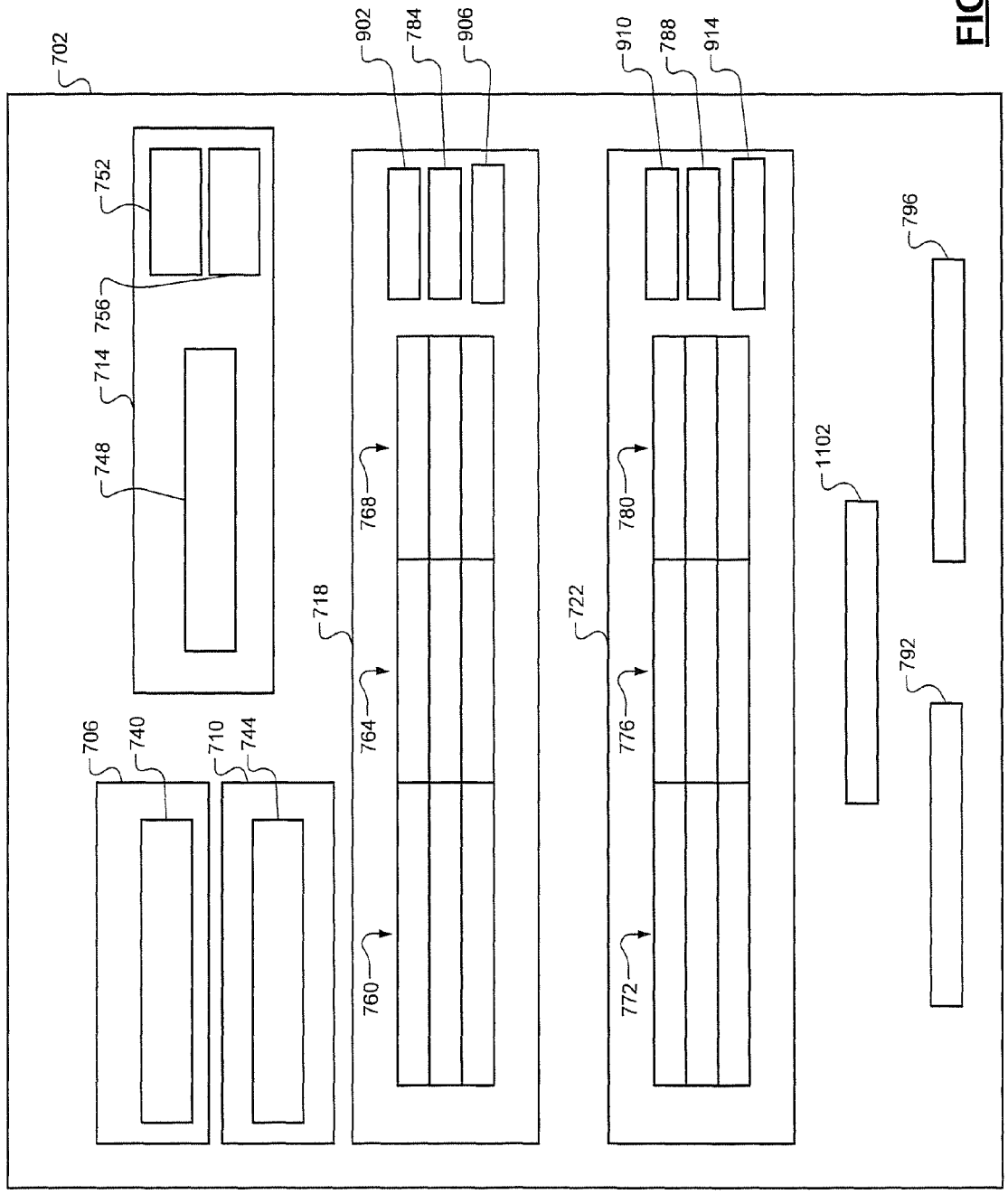
FIG. 11 is another exemplary illustration of the second SIL GUI according to the principles of the present disclosure.

Referring now to FIG. 11, another exemplary diagram of the second SIL GUI 702 is presented. When the user selects the system function from the drop-down menu 744 of the functions field 710, the GUI module 240 activates a scheduling option 1102. More specifically, the GUI module 240 makes the scheduling option 1102 available for selection by the user when the user selects the system function from the functions field 710. When the user selects the scheduling option 1102, the GUI module 240 opens a third SIL GUI.

Figure 12:
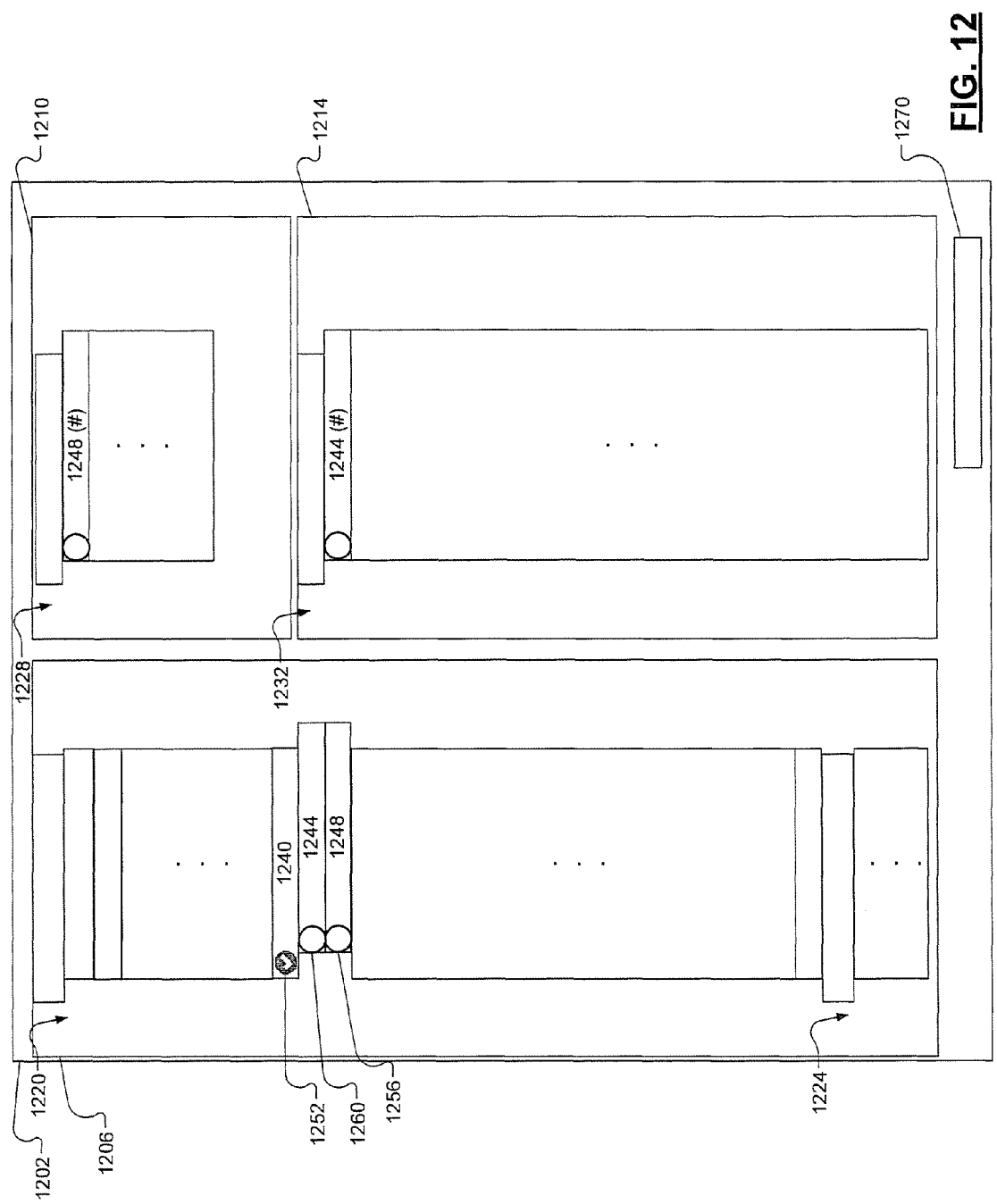
FIGS. 12-14 are exemplary illustrations of a third exemplary SIL GUI according to the principles of the present disclosure.

Referring now to FIG. 12, a diagram of an exemplary third SIL GUI 1202 is presented. The user may, for example, configure execution and/or scheduling of one or more tasks via the scheduling option 1102. The tasks may be performed in a simulation of the selected virtual model with the model file 176. For example only, the tasks may include algorithm tasks, functions, operating system tasks, event tasks, and other suitable types of tasks.

Operating systems tasks and event tasks may be displayed in a first viewing pane 1206 of the third SIL GUI 1202, algorithm tasks may be displayed in a second viewing pane 1210 of the third SIL GUI 1202, and functions may be displayed in a third viewing pane 1214 of the third SIL GUI 1202. More specifically, an operating system tasks list 1220 and an event task list 1224 may be displayed in the first viewing pane 1206. An algorithm tasks list 1228 may be displayed in the second viewing pane 1210, and a functions task list 1232 may be displayed in the third viewing pane 1214.

Each of the lists may include N tasks, where N is an integer greater than zero. The data retrieving module 244 may retrieve the operating system tasks when the scheduling option 1102 is selected. The data retrieving module 244 may also retrieve the algorithm tasks and the functions when the scheduling option 1102 is selected. For example only, the operating system tasks, the algorithm tasks, and the functions may be defined in the XML file.

The data retrieving module 244 populates the lists and displays each of the lists with the respective retrieved tasks. Operating system tasks may be referred to as control system software tasks. An operating system task may refer to a task that is performed in the simulation environment. Algorithm tasks may be referred to as component model tasks. Functions may be referred to as component software tasks. The GUI module 240 may display each of the retrieved operating system tasks with a first type of icon or indicator (not shown), such as a check mark. An example of the first type of icon or indicator is shown at 1252.

Each of the operating system tasks may include one or more sub-tasks, such as one or more of the algorithm tasks and/or one or more of the functions. For example only, exemplary operating system task 1240 may include a function 1244 and an algorithm task 1248. The user may schedule (i.e., add) an algorithm task to be performed with a selected operating system task via the third SIL GUI 1202. The user may additionally or alternatively schedule (i.e., add) a function to be performed with a selected operating system task via the third SIL GUI 1202. For example only, the user may schedule an algorithm task or a function to be performed with one of the operating system tasks by selecting the algorithm task or the function from the respective list and dragging the selected algorithm task or function to the one of the operating system tasks in the first viewing pane 1206.

The GUI module 240 may display each added algorithm task with a second type of icon or indicator (not shown), such as an A. An example of the second type of icon or indicator is shown at 1256. The GUI module 240 may display each added function with a third type of icon or indicator (not shown), such as an F. An example of the third type of icon or indicator is shown at 1260.

For each algorithm in the algorithm tasks list 1228, the GUI module 240 may display a count. A count is also displayed for each of the functions in the functions task list 1232. For example only, the counts for the algorithm task 1248 and function 1244 are illustrated as #. The count of a given algorithm task or function represents the number of instances that the given algorithm task or function appears in the operating system tasks list 1220. The counts are integers greater than or equal to zero.

The user may save the configuration of the third SIL GUI 1202 by selecting a save and continue option 1270. When the user selects the save and continue option 1270, the GUI module 240 may display the second SIL GUI 702. The GUI module 240 may also close the third SIL GUI 1202.

Figure 13:
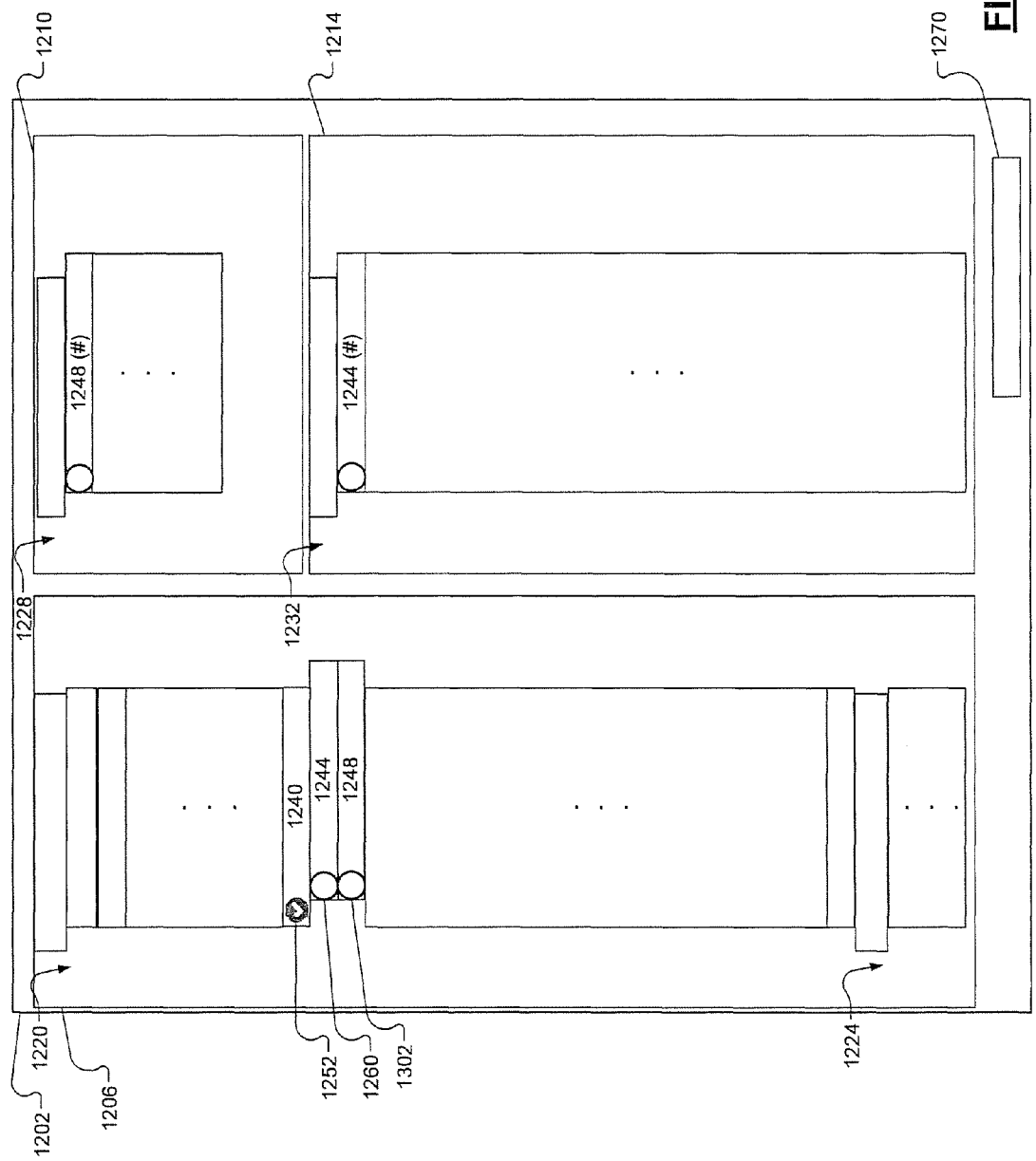

Referring now to FIG. 13, another exemplary diagram of the third SIL GUI 1202 is presented. The user may disable or enable a task scheduled in the operating system tasks list 1220 via the third SIL GUI 1202. For example only, the user may disable a scheduled task by first selecting (e.g., right-clicking) the scheduled task. When the scheduled task has been selected, the GUI module 240 may display a drop-down menu from which the user may select disable or enable. When a scheduled task has been disabled, the task will not be performed during the normal performance of the operating system tasks list 1220. The GUI module 240 may display each disabled algorithm task with a fourth type of icon or indicator (not shown), such as an X. An example of the second type of icon or indicator is shown at 1302. Disabled tasks remain in the operating system tasks list 1220, but are not performed during the performance of the operating system tasks.

The user may also delete an added task from the operating system tasks list 1220 via the third SIL GUI 1202. For example only, the user may delete an added task by first selecting (e.g., right-clicking) the added task. When the scheduled task has been selected, the GUI module 240 may display the drop-down menu from which the user may select disable, enable, or delete. If the user selects delete from the drop-down menu, the added task may be removed from the operating system tasks list 1220.

Figure 14:
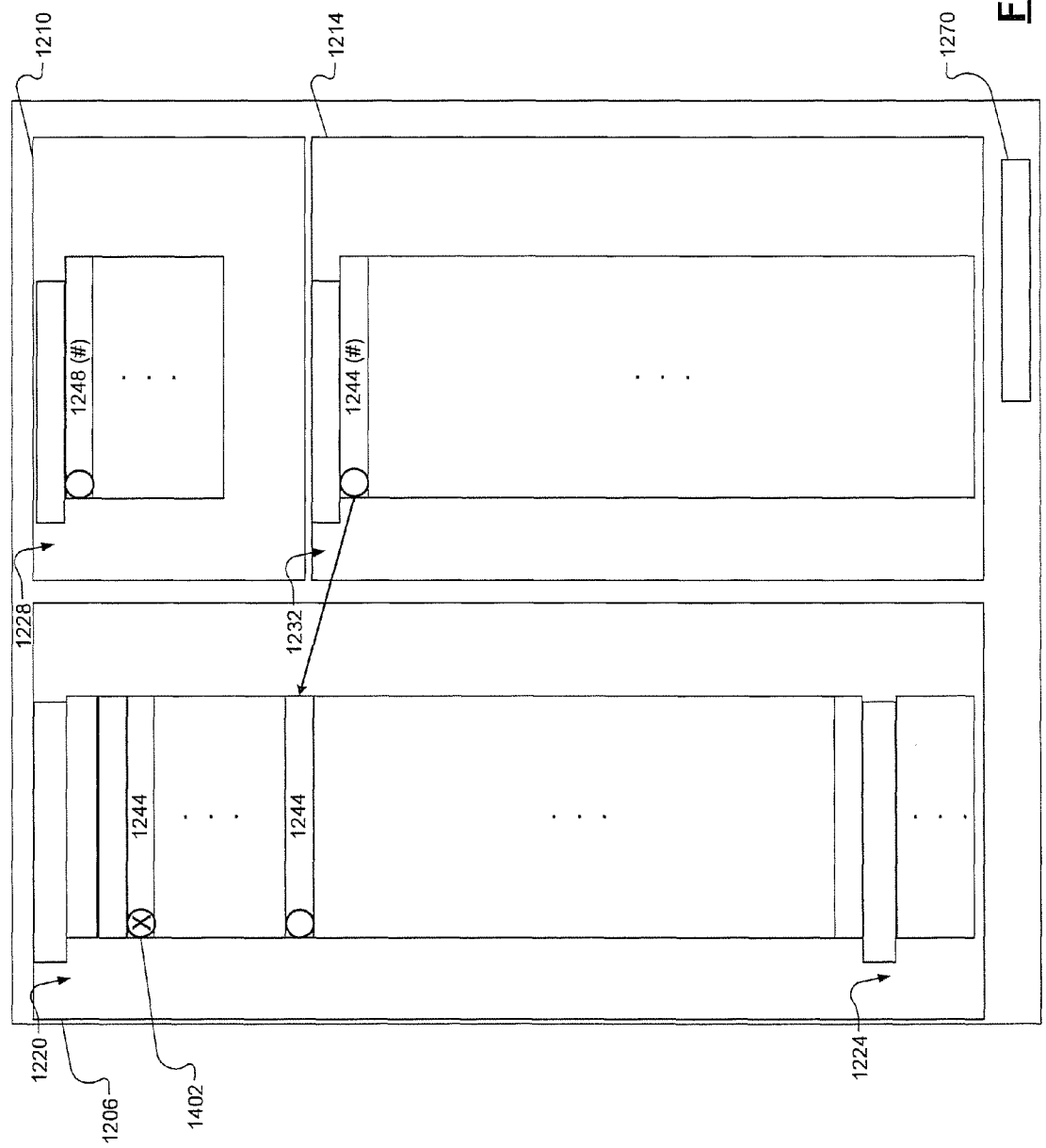

Referring now to FIG. 14, another exemplary diagram of the third SIL GUI 1202 is presented. The user may also re-schedule a scheduled task for another time via the third SIL GUI 1202. For example only, when the function 1244 is scheduled in the operating system tasks list 1220, the user may select the function 1244 from the functions task list 1232. The user may drag the selected function 1244 from the third viewing pane 1214 into the first viewing pane 1206 and more particularly to one of the scheduled tasks. When the user ends the selection of the function 1244, the GUI module 240 inserts the function 1244 above or below the one of the scheduled tasks to re-schedule the function 1244. The GUI module 240 may also disable the function 1244 (illustrated at 1402) and mark the function 1244 as disabled when the user re-schedules the function 1244 within the operating system tasks list 1220.

The user may also bypass a scheduled task in favor of another task via the third SIL GUI 1202. For example only, when the function 1244 is scheduled in the operating system tasks list 1220, the user may select the function 1244 for bypassing. The user may select the function 1244 for bypassing, for example, by right clicking the function 1244 and selecting a "bypass" option. The user may then select another function from the functions task list 1232 to be performed instead of the function 1244 when the function 1244 is to be performed. In this manner, the function 1244 may be bypassed.

Referring back to FIG. 2, the configuration module 248 generates model-based code (e.g., the code in the model source code file 164) based on the configuration of the second and third SIL GUI's 702 and 1202 and the XML file 122. The model updating module 252 generates a model in the modeling/simulation environment based on the model-based code and the source code DLL file 130. The model updating module 252 may generate the model further based on the static library file 134.

The simulation module 256 simulates the operation of the generated model with, for example, the model file 176 (i.e., a model of a plant of the vehicle), one or more other modules, etc. The simulation module 256 may also debug the model-based code. The GUI module 240 may display the simulation in one or more GUIs (not shown). The user may use the second and/or third SIL GUIs 702 and 1202 to re-configure and re-generate the model based on the result of the simulation. While shown and presented as being different, one or more of the modules of FIGS. 1B and 2 may be implemented within one or more of the modules of FIG. 1A.

Figure 15:
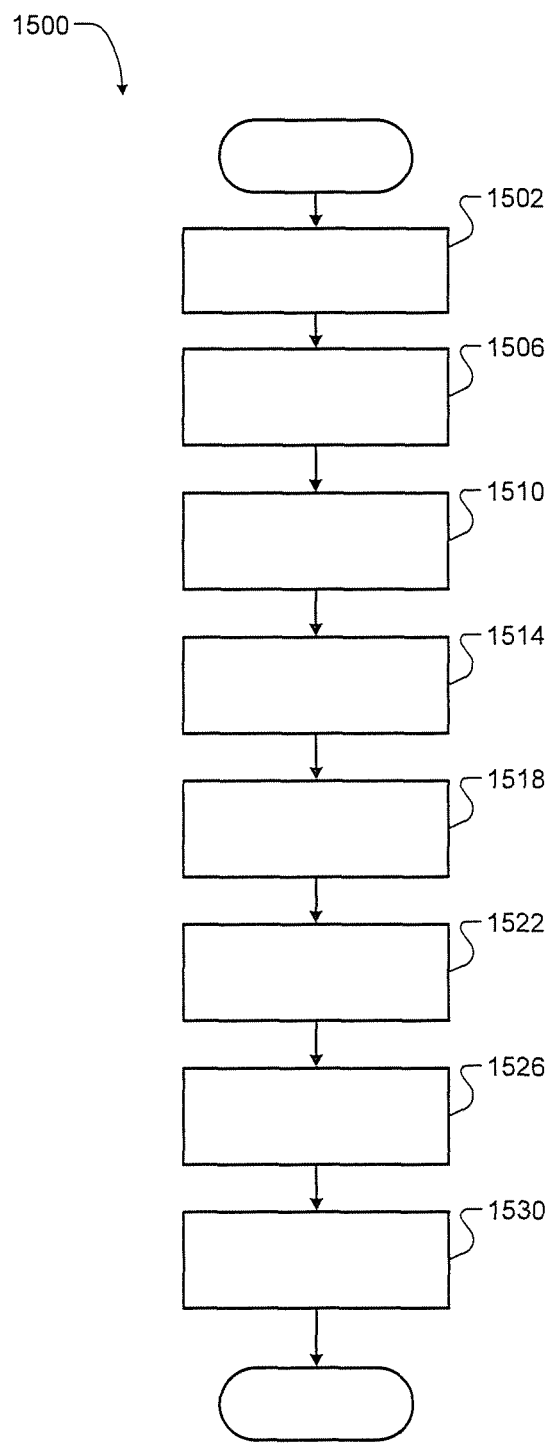
FIG. 15 is an exemplary method of performing a vehicle system simulation according to the principles of the present disclosure.

Referring now to FIG. 15, a flowchart depicting an exemplary method 1500 of performing a vehicle system simulation is presented. Control may begin with 1502 where control generates the object code based on the source code. Control may generate the definitions file and the XML file at 1506. Control may generate the definitions file and the XML file based on the source code and the object code.

At 1510, control may generate the DLL file and the static library file. Control may generate the DLL file and the static library file based on the object code and the definitions file. Control may generate the model-based source code at 1514. Control may generate the model-based source code based on the XML file. Control may also generate a virtual model and display the virtual model in a GUI at 1514.

Control may selectively display one or more GUIs to the user and receive user configurations at 1518. Control may update the model-based source code and the virtual model based on the user configurations at 1522. Control may generate the executable file based on the model-based source code at 1526. The executable file is executable within the simulation environment. Control may perform a simulation involving the virtual model at 1530. Control may then end.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A vehicle simulation system comprising:
    a compiler module that generates object code that is compatible with a first type of operating system based on source code that is executable by a vehicle control module and that is compatible with a second type of operating system;
    a parser module that generates a definitions file and an extensible markup language (XML) file based on the source code and the object code;
    a wrapper module that generates a library file based on the object code and the definitions file;
    a modeling module that generates model-based source code for a virtual model based on the XML file and a user configuration of the virtual model; and
    a simulation module that simulates operation of a plant of a vehicle with the virtual model.

2. The vehicle simulation system of claim 1 wherein the modeling module comprises:
    a graphical user interface (GUI) module that displays a configurable module in a first GUI and that displays a second GUI when the configurable module is selected;
    a data retrieving module that retrieves data for the virtual model from the XML file and that selectively populates menus of the second GUI based on the retrieved data.

3. The vehicle simulation system of claim 2 wherein the modeling module further comprises:
    a configuration module that generates the model-based source code based on the XML file and the user configuration input via the second GUI; and
    a model updating module that updates the configurable module displayed in the first GUI based on the user configuration input via the second GUI.

4. The vehicle simulation system of claim 2 wherein the data retrieving module presents the virtual model for selection via a first one of the menus,
    wherein the data retrieving module presents a function to be called by the virtual model for selection via a second one of the menus, and
    wherein the data retrieving module presents a variable for addition as one of an input to and an output from the function via a third one of the menus.

5. The vehicle simulation system of claim 2 wherein the GUI module displays a third GUI when a task scheduling option of the second GUI is selected.

6. The vehicle simulation system of claim 5 wherein the configuration module generates the model-based source code further based on a configuration input via the third GUI.

7. The vehicle simulation system of claim 5 wherein the data retrieving module generates a list of tasks based on the XML file.

8. The vehicle simulation system of claim 7 wherein the data retrieving module presents at least one of an algorithm task and a function for addition to the list of tasks via the third GUI.

9. The vehicle simulation system of claim 7 further comprising an executable generating module that generates an executable file based on the library file and the model-based source code,
    wherein the executing module simulates the operation of the plant using the executable file, the list of tasks, and a virtual model of the plant.

10. The vehicle simulation system of claim 1 wherein the first and second operating systems are different.

11. A vehicle simulation method comprising:
    generating object code that is compatible with a first type of operating system based on source code that is executable by a vehicle control module and that is compatible with a second type of operating system;
    generating a definitions file and an extensible markup language (XML) file based on the source code and the object code;
    generating a library file based on the object code and the definitions file;
    generating model-based source code for a virtual model based on the XML file and a user configuration of the virtual model; and
    simulating operation of a plant of a vehicle with the virtual model.

12. The vehicle simulation method of claim 11 further comprising:
    displaying a configurable module in a first graphical user interface (GUI);
    displaying a second GUI when the configurable module is selected;
    retrieving data for the virtual model from the XML file; and
    selectively populating menus of the second GUI based on the retrieved data.

13. The vehicle simulation method of claim 12 further comprising:

generating the model-based source code based on the XML file and the user configuration input via the second GUI; and updating the configurable module displayed in the first GUI based on the user configuration input via the second GUI.

14. The vehicle simulation method of claim 12 further comprising:

presenting the virtual model for selection via a first one of the menus;

presenting a function to be called by the virtual model for selection via a second one of the menus; and presenting a variable for addition as one of an input to and an output from the function via a third one of the menus.

15. The vehicle simulation method of claim 12 further comprising displaying a third GUI when a task scheduling option of the second GUI is selected.

16. The vehicle simulation method of claim 15 further comprising generating the model-based source code further based on a configuration input via the third GUI.

17. The vehicle simulation method of claim 15 further comprising generating a list of tasks based on the XML file.

18. The vehicle simulation method of claim 17 further comprising presenting at least one of an algorithm task and a function for addition to the list of tasks via the third GUI.

19. The vehicle simulation method of claim 17 further comprising:

generating an executable file based on the library file and the model-based source code; and simulating the operation of the plant using the executable file, the list of tasks, and a virtual model of the plant.

20. The vehicle simulation method of claim 11 wherein the first and second operating systems are different.

* * * * *